United States Patent
Zolfaghari

(10) Patent No.: US 7,869,771 B2
(45) Date of Patent: Jan. 11, 2011

(54) MULTI-BAND TRANSFORMER FOR WIRELESS TRANSMITTER

(75) Inventor: Alireza Zolfaghari, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1070 days.

(21) Appl. No.: 11/474,007

(22) Filed: Jun. 23, 2006

(65) Prior Publication Data

US 2007/0298731 A1 Dec. 27, 2007

(51) Int. Cl.
H04B 1/44 (2006.01)

(52) U.S. Cl. .................. 455/78; 455/101; 455/106; 455/232.1; 455/248.1; 455/333; 340/539.3; 340/855.8; 363/17; 363/42; 363/21.18; 363/56.02

(58) Field of Classification Search ............... 455/78, 455/101, 106, 127.1, 232.1, 248.1, 333; 363/42, 363/17, 56.02, 98; 340/854.4
See application file for complete search history.

(56) References Cited

U.S. PATENT DOCUMENTS

| | | | |
|---|---|---|---|
| 5,498,995 A * | 3/1996 | Szepesi et al. .............. 327/538 |
| 5,652,699 A * | 7/1997 | Kim et al. ...................... 363/8 |
| 6,160,722 A * | 12/2000 | Thommes et al. ............. 363/37 |
| 6,169,683 B1 * | 1/2001 | Farrington .................. 363/127 |
| 6,490,183 B2 * | 12/2002 | Zhang ......................... 363/89 |
| 6,744,647 B2 * | 6/2004 | Cohen .......................... 363/71 |
| 6,757,183 B2 * | 6/2004 | Feldtkeller et al. ............ 363/49 |
| 7,102,343 B1 * | 9/2006 | Brown ........................ 323/361 |
| 7,170,465 B2 * | 1/2007 | Rofougaran ................ 343/850 |
| 7,385,445 B2 * | 6/2008 | Wright ........................ 330/51 |
| 7,394,397 B2 * | 7/2008 | Nguyen et al. ........... 340/693.3 |
| 7,403,400 B2 * | 7/2008 | Stanley ........................ 363/16 |
| 7,466,566 B2 * | 12/2008 | Fukumoto .................... 363/17 |
| 2009/0163157 A1 | 6/2009 | Zolfaghari |

* cited by examiner

Primary Examiner—Marceau Milord
(74) Attorney, Agent, or Firm—Brake Hughes Bellermann LLP

(57) ABSTRACT

Various embodiments are disclosed relating to wireless transmitters, and also relating to multi-band transformers. According to an example embodiment, an apparatus may include a multi-band transformer configured to receive as an input a signal associated with a first frequency band or a signal associated with a second frequency band. The transformer may include one or more inputs and a first output and a second output. The transformer may also include one or more switches coupled to the transformer and configured to selectively output a received input signal onto the first output and/or the second output of the transformer.

17 Claims, 7 Drawing Sheets

Use of Power control switches (e.g., 602, 612), e.g., to adjust power or voltage for output signal on outputs from transformer 302

US 7,869,771 B2

MULTI-BAND TRANSFORMER FOR WIRELESS TRANSMITTER

BACKGROUND

Wireless transceivers are used in a wide variety of wireless systems. A wireless transceiver may typically include a wireless receiver for receiving and demodulating signals, and a transmitter for modulating signals for transmission. Wireless devices typically include a power amplifier coupled to the transceiver to amplify and transmit signals. Some wireless systems may also provide operation for multiple frequency bands. However, many circuits used for wireless devices are tuned or operable specifically for one band, or separate duplicate circuits may typically be used for multi-band systems. In some cases, this may require multiple circuits, e.g., one circuit for each band in the case of a multi-band transceiver, which can increase the size and cost of the circuits.

SUMMARY

Various embodiments are disclosed relating to wireless systems, and also relating to a multi-band transformer for wireless transmitters.

According to an example embodiment, an apparatus is provided. The apparatus may include a multi-band transformer configured to receive as an input a signal associated with a first frequency band or a signal associated with a second frequency band. The transformer may include one or more inputs and a first output and a second output. The transformer may also include one or more switches coupled to the transformer and configured to selectively output a received input signal onto the first output and/or the second output of the transformer.

According to an example embodiment, the one or more switches may include a first switch coupled to the first output of the transformer and configured to selectively couple the first output to a first voltage (e.g., ground or VDD) to output a received signal associated with the second frequency band onto the second output of the transformer. The one or more switches may also include a second switch coupled to the second output of the transformer and configured to selectively couple the second output to a second voltage (e.g., ground or VDD) to output a received signal associated with the first frequency band onto the first output of the transformer.

In another embodiment, the apparatus may also include one or more switchable capacitors coupled to the transformer to selectively tune an operation of the transformer to either the first frequency band or the second frequency band.

In yet another embodiment, the one or more switches may include one or more power control switches to selectively vary, based on a received power control signal, the power of a signal output onto the first or second outputs of the transformer.

In yet another embodiment, an apparatus may be provided. The apparatus may include a transformer, including a first (e.g., primary) transformer winding coupled to first and second differential inputs, and a second (e.g., secondary) transformer winding coupled to a first single-ended output and a second single-ended output, the first single-ended output configured to output a signal associated with a first frequency band and the second single-ended output configured to output a signal associated with a second frequency band. The apparatus may also include a first switch coupled to the first single-ended output of the transformer and configured to selectively couple the first single-ended output to a first voltage (e.g., ground or VDD) to substantially allow a signal associated with the second frequency band to be output onto the second single-ended output of the transformer, and a second switch coupled to the second single-ended output of the transformer and configured to selectively couple the second single-ended output to a second voltage (e.g., ground or VDD) to substantially allow a signal associated with the first frequency band to be output onto the first single-ended output of the transformer.

According to another embodiment, a method is provided. The method may include selecting one of a first and a second outputs of a transformer to output a signal, providing a plurality of power control switches coupled in parallel to the first output and/or the second output of the transformer. The method may also include adjusting power for the selected output by configuring the power control switches coupled to the first output and/or the second output. In an example embodiment, the method may also include decreasing a power applied to the selected output, e.g., by opening one or more power control switches coupled to the unselected output, and, if necessary, by closing one or more power control switches coupled to the selected output.

DETAILED DESCRIPTION

Figure 1:
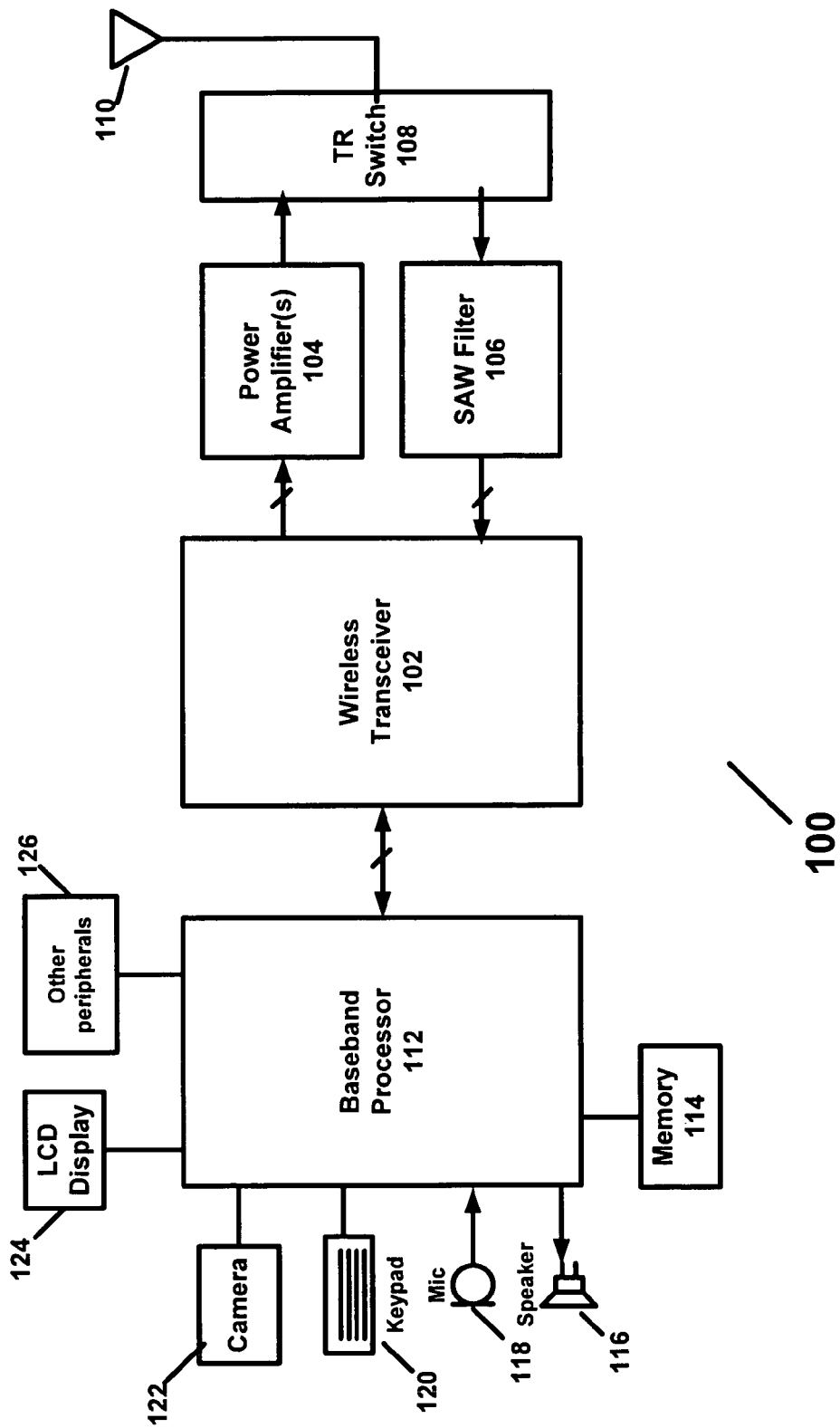
FIG. 1 is a block diagram of a wireless system according to an example embodiment.

FIG. 1 is a block diagram of a wireless system according to an example embodiment. Wireless system 100 may include a wireless transceiver (transmitter/receiver) 102 for transmitting and receiving radio or wireless signals. A baseband processor 112 is coupled to wireless transceiver 110 to perform various types of processing and overall control of system 100, and may perform other tasks. Baseband processor 112 may include a controller, and may include for example, an audio codec to process audio signals, a video or image processing codec (e.g., an MPEG4 compression and/or decompression module), and other components or blocks, not shown.

An antenna 110 may be provided to receive and transmit radio signals or electromagnetic signals. A transmitter/receiver (TR) switch 108 may select either the transmit or receive mode for the antenna 110. Signals output by wireless transceiver 102 to be transmitted may be amplified by amplifier 104 and then transmitted via antenna 110. Signals at radio frequency (RF) (which may be a wireless transmission frequency, not limited to a specific range of frequencies) may be received via antenna 110 may, for example. The received RF signals may be filtered by a SAW (surface acoustic wave) filter 106 (or other filter) and then input to transceiver 102.

At transceiver 102, the received signals may be processed or demodulated, which may include down-converting the signals to an intermediate frequency (IF) and then down-converting to baseband or other frequency, digital detection of data and other signal processing. Likewise, digital data to be transmitted may be received by transceiver 102 from baseband processor 112. Wireless transceiver 110 may modulate the digital data from baseband processor 112 onto a selected channel or frequency (or range or spectrum of frequencies) for transmission over antenna 110.

A variety of blocks or peripherals may be coupled to baseband processor 112. For example, a memory 114, such as a Flash memory or Random Access Memory (RAM), may store information. A microphone 118 and speaker 116 may allow audio signals to be input to and output by wireless system 100, such as for a cell phone or other communications device. A keypad 120 may allow a user to input characters or other information to be processed by wireless system 100. A camera 122 or other optical device may be provided to allow users to capture photos or images that may be processed and/or stored by system 100 in memory or other storage location. Wireless system 100 may also include a display 124, such as a liquid crystal display for example, to display information (text, images, etc.). A variety of other peripherals 126 may be coupled to baseband processor 112, such as a memory stick, an audio player, a Bluetooth wireless transceiver, a USB (Universal Serial Bus) port, or other peripheral. These are merely a few examples of the types of devices or peripherals that may be provided as part of wireless system 100 or coupled to baseband processor 112, and the disclosure is not limited thereto.

Wireless system 100 may be used in a variety of systems or applications, such as a mobile or cellular phone, a wireless local area network (WLAN) phone, a wireless personal digital assistant (PDA), a mobile communications device, or other wireless device. In an example embodiment, wireless system 100 may be capable of operating in a variety of transmit/receive frequencies or frequency bands and for a variety of different standards or communications protocols. Although not required, wireless system 100 may be a multi-band wireless system capable of transmitting or receiving signals on one of a plurality of frequencies or bands. For example, wireless system 100 may operate at or around 1900 MHz for WCDMA (Wide-Band Code Division Multiple Access) or PCS (Personal Communications Services), at or around 1800 MHz for DCS (Distributed Communication Services) (these frequencies may be considered an upper band or high band of frequencies), at 850 MHz for GSM (Global System for Mobile communication), at or around 900 MHz for EGSM (Extended GSM) (these frequencies may be considered a lower band or low band of frequencies). These are merely some example frequencies, and the system 100 may operate at many other frequencies and standards.

The term RF (also known as radio frequency) may refer to any transmitted wireless signal frequency range, and is not limited to a specific frequency band or range. Rather, RF signals may be signals received at the 1.9 GHz range, 1.8 GHz range, 850 MHz range, 900 MHz range, other wireless transmission frequency ranges, etc. The term IF (or intermediate frequency) may refer to a frequency range, which may be variable, and that is typically lower than RF. Circuits within a wireless receiver typically down-convert or translate received signals from an RF frequency to an IF frequency to perform some types of processing in some cases. In some cases, an IF frequency range may include frequencies relatively close to zero Hz (as compared to RF), such as 1 KHz, 20 KHz, 100 KHz, 200 KHz, 500 KHz, 900 KHz, etc., or other appropriate IF frequency.

Figure 2:
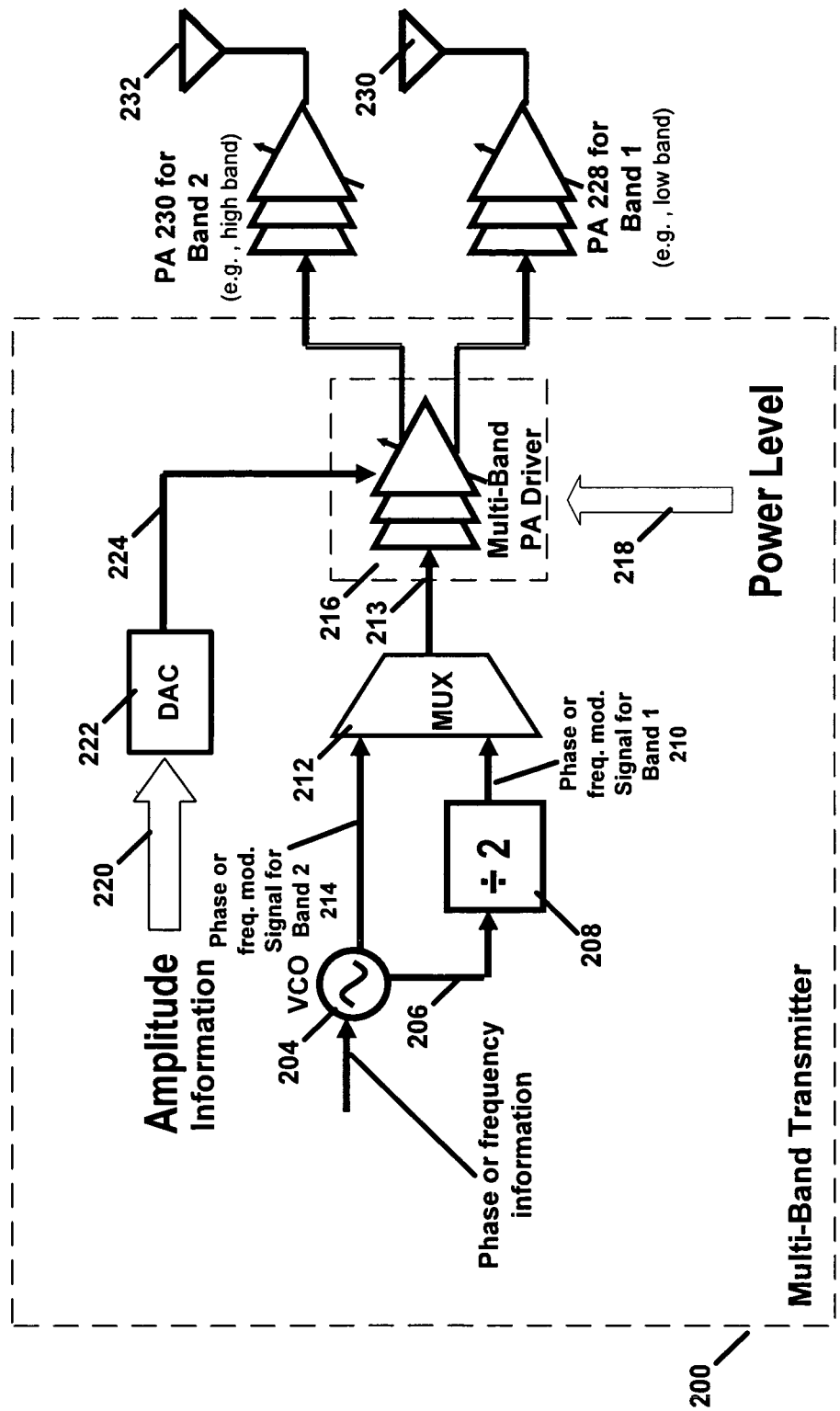
FIG. 2 is a block diagram of a multi-band wireless transmitter according to an example embodiment.

FIG. 2 is a block diagram of a multi-band wireless transmitter 200 according to an example embodiment. Multi-band transmitter 200 may be included within wireless transceiver 102, for example. Wireless transceiver 102 may also include a wireless receiver, not shown. According to an example embodiment, multi-band transmitter 200 may include a number of blocks or circuits, some of which are shown in FIG. 2.

In an example embodiment, multi-band transmitter 200 may include a multi-band power amplifier (PA) driver 216. Multi-band PA driver 216 may, for example, output signals to or drive multiple power amplifiers (PAs), such as to PAs 228 and 230. While only two power amplifiers (PAs) are shown in FIG. 2, PA driver 216 may output signals to or drive any number of PAs. Power amplifiers are also shown generally as power amplifier(s) 140 in FIG. 1.

In an example embodiment, power amplifier (PA) 228 may be coupled to a first output of PA driver 216 to receive and amplify signals associated with a first frequency band or band 1, such as a low band (e.g., 850 and 900 MHz), for example. Similarly, a PA 230 may be coupled to a second output of PA driver 216 to receive and amplify signals for (or associated with) a second frequency band or band 2, such as a high band (e.g., 1850 and 1900 MHz). An antenna 230 is coupled to an output of PA 228, and an antenna 232 is coupled to an output of PA 230. According to an example embodiment, by using one multi-band PA driver to drive multiple power amplifiers (e.g., fewer PA drivers than PAs), a wireless transmitter may, in some cases, be provided that may have a lower cost and/or require less circuitry or silicon space.

Although not required, according to an example embodiment, PA driver 216 may receive a differential input (e.g., positive and negative signals), and may output a signal as a single-ended output to either PA 228 (e.g., when operating in band 1 or low band), and/or to PA 230 (e.g., when operating in band 2 or high band). Therefore, according to an example embodiment and as described in greater detail below, multi-band PA driver 216, in an example embodiment, may provide a conversion from a differential input signal to a single-ended output.

A number of other blocks for multi-band transmitter 200 in FIG. 2 will now be briefly described. A voltage controlled oscillator (VCO) 204 controlled by a phase-locked-loop (PLL) may generate a phase or frequency modulated signal as a VCO output onto lines 214 and 206. Multi-band transmitter 200, may, for example, transmit on one of a plurality of frequency bands, such as either on band 1 (e.g., low band) or band 2 (e.g., high band)), depending on which band the wireless transmitter is operating.

VCO 204 may output a phase and/or frequency modulated signal onto lines 214 and 206. To obtain the lower RF frequency for low band or band 1, the modulated signal output by VCO 204 may, for example, be frequency divided by frequency divider 208 to provide the phase or frequency modulated signal for band 1 (e.g., low band) onto line 210. Multiplexer (or mux) 212 may select one of its inputs for output onto line 213. For example, mux 210 may select the modulated signal received via line 214 when operating for band 2 (e.g., when operating in high band), and may select the signal received via line 210 for band 1 (e.g., when operating in low band), for example.

According to an example embodiment, multi-band PA driver 216 may adjust or vary the power of an output signal based upon a power control signal received via line 218. The power control signal received via line 218 may, for example, be a digital control signal that may control the opening or closing of one or more power control switches or switchable resistors that may adjust or vary the output power of the output signal, for example. Other techniques may be used to adjust the power level of the output signal from PA driver 216.

In an example embodiment, in GSM mode or other types of operating modes, multi-band transmitter 200 may transmit a phase or frequency modulated signal, such as a GMSK modulated signal. In such a GSM mode, the amplitude of the output signal may be constant or substantially constant. However, in other modes of operation, such as EDGE, which may use 8PSK modulation for example, the output signal may be both phase and amplitude modulated. Therefore, amplitude information may be received via line 220 and converted from digital to analog by digital-to-analog converter (DAC) 222 to output an analog amplitude signal onto line 224. In EDGE mode or other mode that may use amplitude modulation, multi-band PA driver 216 may receive a phase (or frequency) modulated signal via line 213. PA driver 216 may amplitude modulate the phase modulated signal received via line 213 based on the amplitude signal received via line 224 to output a phase and amplitude modulated signal, for example. In an example embodiment, although not required, the phase or frequency modulated signal received via line 213 may be received at PA driver 216 as a differential signal, while the outputs from PA driver 216 may each be provided as single-ended outputs to PA 228 and PA 230.

Figure 3:
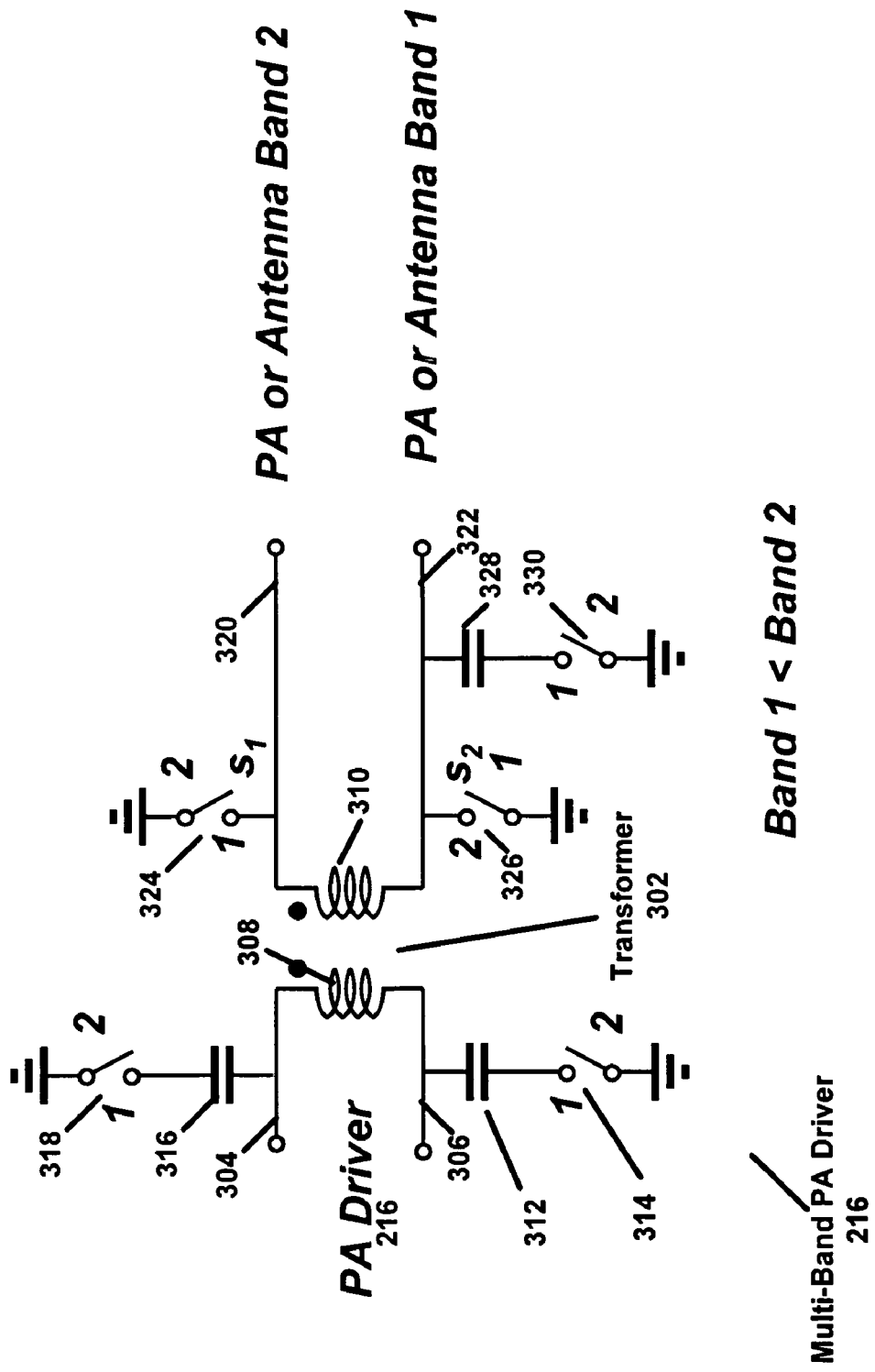
FIG. 3 is a diagram illustrating a multi-band PA driver according to an example embodiment.

FIG. 3 is a diagram illustrating a multi-band PA driver according to an example embodiment. As shown in FIG. 3, PA driver 216 may include a transformer 302 that may include a primary transformer winding 308 and a secondary transformer winding 310. According to an example embodiment, differential input signals may be received at inputs 304 and 306 of transformer 302. Transformer 302 may include a plurality of single-ended outputs, e.g., a single-ended output for each band, or to drive each PA. For example, output 320 may be coupled to PA 230, e.g., for band 2, while output 322 may be coupled to PA 228, e.g., for band 1. Therefore, according to an example embodiment, transformer 302 may substantially output a signal associated with a first frequency band or band 1 onto output 322, and may substantially output a signal associated with a second frequency band or band 2 onto output 320, for example. However, a portion of the voltage or power from transformer 302 may be applied to an unselected output of transformer 302, even though such unselected output may not be transmitting signals.

A switch 324 is coupled to output 320 and may be closed to couple the output 320 to ground, with switch 326 open, and thereby substantially allow the signal received on the differential inputs 304 and 306 to be output on single-ended output 322 to drive PA 228 for band 1, e.g., as measured to ground. However, in some cases, a portion of the voltage or power output from the transformer 302 may be provided on the other (unselected) output 320 even though the PA (PA 230) for such unselected output may not be transmitting in such case.

Likewise, a switch 326 is coupled to output 322 and may be closed to couple the output 322 to ground, with switch 324 open, and thereby substantially allow the signal received on the differential inputs 304 and 306 to be output on single-ended output 320 to drive PA 230 for band 2 (although a portion of the power may be provided on the unselected output 322, even though PA 228 for band 1 may not be transmitting in such case).

Therefore, according to an example embodiment, when multi-band transmitter 200 is operating in band 1 or transmitting in low band, switch 324 may be closed and switch 326 may be open and the received input signal on band 1 may then be substantially output onto output 322 to drive PA 228 for band 1. Likewise, according to an example embodiment, when multi-band transmitter 200 is operating in band 2 or transmitting in high band, switch 326 may be closed and switch 324 may be open and the received input signal on band 2 may then be substantially output onto output 320 to drive PA 230 for band 2. Thus, a switch coupled to the output to drive the associated PA may be open, with the other switch(es) closed, for example. This may, for example, allow a substantial portion of the voltage or power output from transformer 302 to be applied, in some cases, to the selected output to drive the associated PA for transmission.

The use of switches 324 and 326 may allow, for example, one transformer 302 (and PA driver 216) to accommodate multiple frequency bands, and output a received signal onto one of a plurality of outputs to drive a PA associated with the particular band that is being used. Thereafter, when PA driver 216 switches from band 1 to band 2, for example, the configuration of switches 324 and 326 may be changed to accommodate the change in frequency band, e.g., by closing switch 326 and opening switch 324, to now substantially output the received signal onto output 320 to drive PA 230 for band 2, as an example. Thus, rather than using a separate PA driver for each band or PA, according to an example embodiment, one multi-band PA driver 216 may be used to drive a plurality of PAs (e.g., PA 228 and 230), where each PA may be provided for one or more frequency bands.

In addition, according to an example embodiment, although not required, transformer 302 may be tuned to operate in either band 1 or band 2. By tuning transformer 302 to operate in a specific frequency band (e.g., either band 1 or band 2), performance of transformer 302 may be improved, for example. A resonance frequency of a circuit, such as transformer 302, may be inversely proportional to capacitance. Thus, adding capacitance to the circuit may decrease the resonance frequency of a circuit, for example, and allow better performance at a lower frequency in some cases.

Therefore, one or more switchable capacitors may be switched in to add capacitance when transformer 302 is operating at band 1 or low band. For example, switches 318, 314 and 330 may be closed to add capacitance when transformer 302 is operating in band 1. For example, switch 318 is coupled between input 304 and capacitor 316. Switch 318 may be closed when transformer 302 is operating in band 1, and may be open when operating in band 2. Switch 314 may be coupled between capacitor 312 and ground at input 306. Switch 314 may be closed to couple capacitor 312 to ground at input 306 when operating in band 1 (e.g., low band), and may be opened when operating in band 2, for example. Switch 330, coupled between ground and capacitor 328 at output 322. Switch 330 may be closed when transformer 302 is operating in band 1, and may be open when operating in band 2. One or more of these capacitors (or other capacitors) may be switched in to provide additional capacitance and tune transformer 302 to operate at a specific frequency band, for example. N-channel metal oxide semiconductor (NMOS) transistors, for example, may be used for switches 318, 314 and 330, in an example embodiment, although other types of transistors or circuits may be used as well.

In the examples described above multi-band PA driver 216 and transformer 302 are shown as operable for only two frequency bands, e.g., band 1 and band 2. Thus, in the example embodiment shown in FIGS. 2 and 3, PA driver 216 may be referred to as a dual-band PA driver, and transformer 302 may be referred to as a dual-band transformer, in this example, since PA driver 216 and transformer 302 drives two PAs (PA 228 and PA 230). However, PA driver 216 and transformer 302 may be operable for and drive any number of frequency bands or PAs. For example, transformer 302 may be a three-tap transformer to drive three PAs, for example. Thus, by adding more taps to transformer 302, any number of PA drivers may be accommodated.

The term multi-band PA driver or multi-band transformer may refer to a PA driver or transformer having the ability to drive multiple (or a plurality of) bands or PAs, e.g., two bands (dual-band embodiment), three bands, or more, for example. Therefore, the term multi-band includes a dual-band embodiment where two bands or two PA drivers are driven by the PA driver 216 or transformer 302. Although the various example embodiments shown in the FIGs. and described herein include only two bands or two PA drivers, transformer 302 may drive any number of bands or PA drivers, e.g., by providing additional taps, as noted.

With respect to tuning the transformer 302 if, for example, multi-band PA driver 216 is operated at three different frequency bands, e.g., driving three different PAs, then no additional capacitors may be used for a high frequency band, two (for example) additional capacitors may be switched in when operating in the medium frequency band, and three additional capacitors may be switched in when operating the transformer at a low band. This may allow the transformer to be tuned to a particular frequency or band of operation, for example. This is merely another example, and many other variations or embodiments may be used. As noted, to drive three bands or three PAs, a three-tap transformer 302 may be used.

Figure 4:
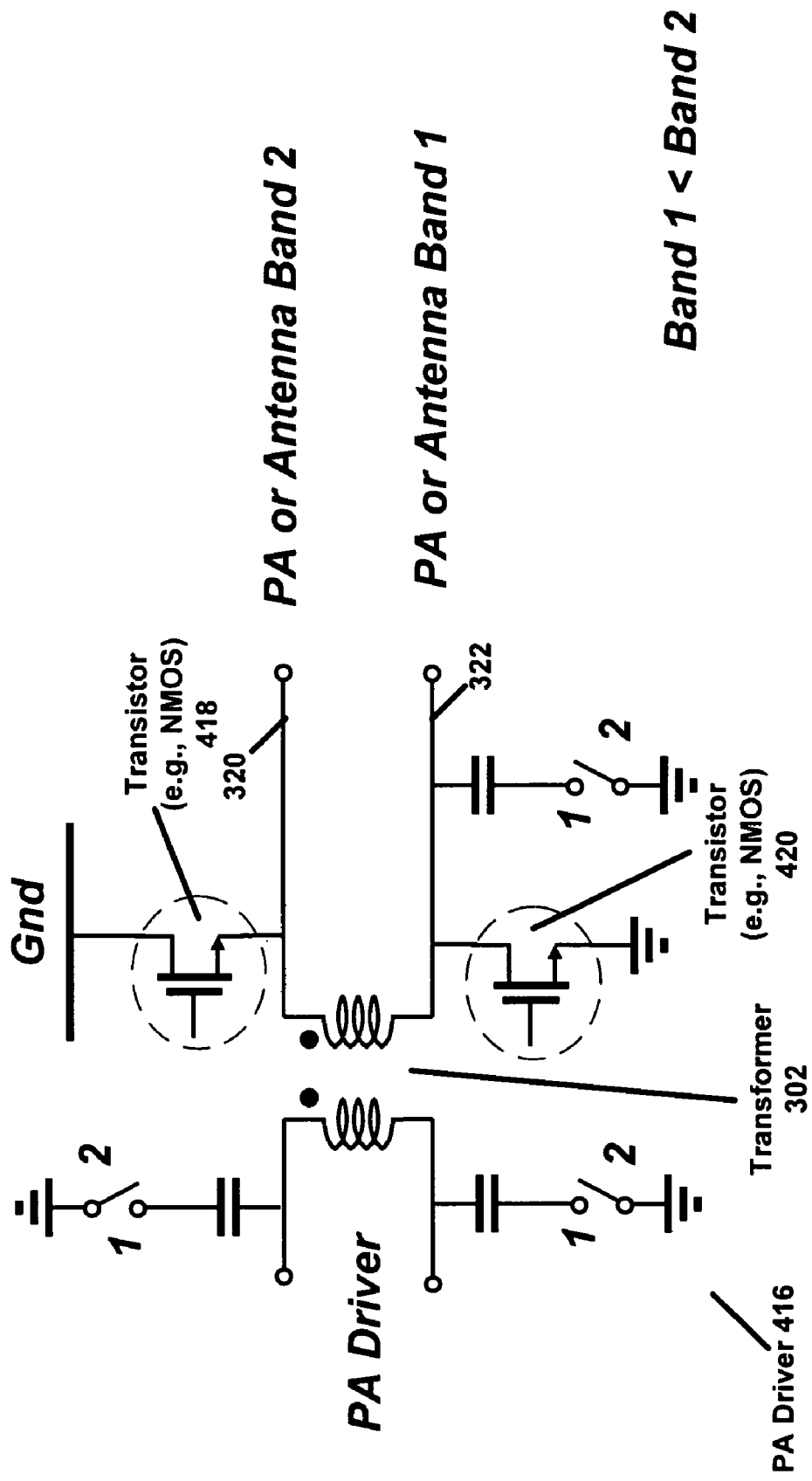
FIG. 4 is a diagram illustrating a multi-band PA driver according to another example embodiment.

FIG. 4 is a diagram illustrating a multi-band PA driver 416 according to another example embodiment. Multi-band PA driver 416 is shown in FIG. 4, and may be generally the same as the PA driver 216 shown in FIG. 3. However, in FIG. 4, switch 324 (from FIG. 3) is implemented as a transistor 418, while switch 326 (from FIG. 3) may be implemented as a transistor 420. In an example embodiment, transistors 418 and 420 may be a same type of transistor, e.g., both transistors may be NMOS transistors, or both transistors may be PMOS (P-channel MOS) transistors, as examples.

Briefly, in operation, if a signal associated with band 1 (e.g., low band) is received (e.g., transformer 302 operating at band 1 or low band), signals may be applied to the gates of transistors 418 and 420 so as to turn on transistor 418 and turn off transistor 420. This may allow the modulated input signal received at the inputs to transformer 302 to be output, e.g., as a single-ended output, onto output 322 to drive PA 228 for band 1, for example. The output signal provided on output 322 is biased to ground. In some cases, when a negative portion of the output signal on output 322 drops below or exceeds about −0.7V (the diode junction voltage), transistor 420 may typically clip the output signal on output 322, causing the output signal to be distorted.

Similarly, when operating in band 2, e.g., high band, signals may be applied to the gates of transistors 418 and 420 so as to turn on transistor 420 and turn off transistor 418. This may allow the modulated input signal received at the inputs to transformer 302 to be output, e.g., as a single-ended output, onto output 320 to drive PA 230 for band 2, for example. A similar clipping of the output signal on output 320 may occur for band 2 or high band.

Figure 5:
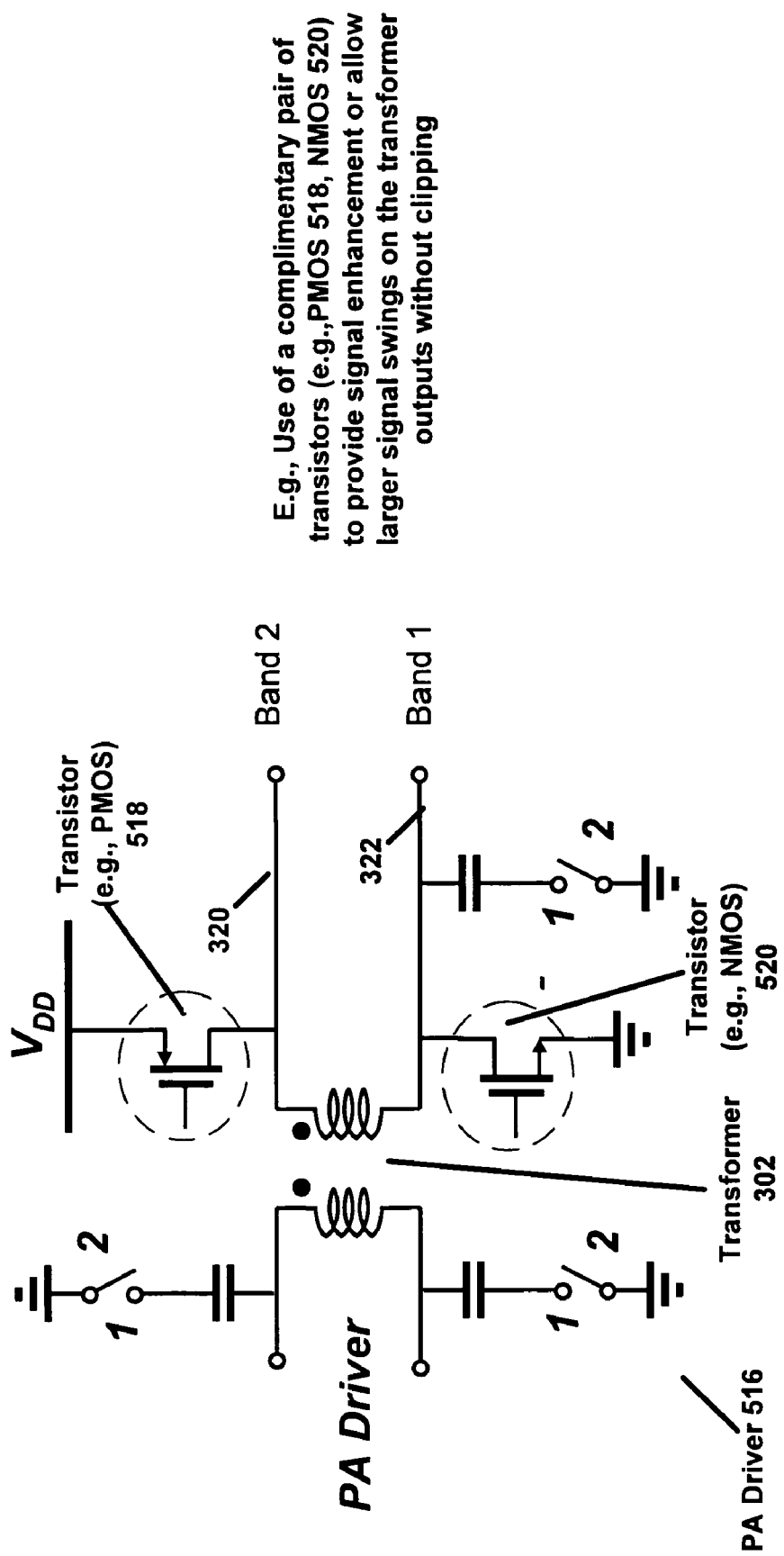
FIG. 5 is a diagram illustrating a multi-band PA driver according to yet another example embodiment where a complimentary set of transistors may be used for switches for outputs.

FIG. 5 is a diagram illustrating a multi-band PA driver 516 according to yet another example embodiment where a complimentary set of transistors may be used for switches for outputs. The PA driver 516 is very similar to the PA driver 416 of FIG. 4. However, PA driver 516 may use a complimentary set of transistors 518 and 520 to provide signal enhancement. For example, a PMOS transistor 518 may be coupled between output 320 and VDD, where VDD may be a power supply voltage, typically between 1.5V and 3.0V, for example. Transistor 520 may be an NMOS transistor coupled between ground and output 322, for example. In an example embodiment, when operating in band 1, e.g., low band, transistor 518 may be turned on, and transistor 520 may be turned off to allow the received signal to be substantially output onto output 322 for band 1. Similarly, when operating in band 2, e.g., high band, transistor 520 is turned on, and transistor 518 is turned off to allow the received signal to be substantially output onto output 320 for band 2.

However, in the case of using a complimentary set of transistors (e.g., PMOS 518, NMOS 520) for switches to control signal output onto single-ended outputs for different bands for transformer 302, a signal enhancement of approximately VDD may be achieved on the outputs 320 and 322 (e.g., as compared to use of two transistors of the same type in FIG. 4). For example, in the case of operating at band 1 or low band, because PMOS transistor 518 is coupled to VDD (instead of ground), the output signal provided on output 322 may be biased at VDD (not ground as in the case for FIG. 4). Thus, for the circuit of FIG. 5, the signal output onto output 322 will typically not be clipped until the output signal, on the negative side, exceeds −(VDD+diode junction voltage). Thus, the output signal on output 322 will typically not be clipped until the negative portion of the output signal exceeds about −2.1V, in the example where VDD is about 1.5V, and the example diode junction voltage is about 0.6V. Greater signal enhancement may be achieved by increasing VDD (e.g, from 1.5V to 2.5V), for example.

Thus, the use of a complimentary set of transistors (e.g., including a first transistor coupled to VDD, and a second transistor coupled to ground) for switches to control signal outputs on the transformer 302 may provide signal enhancement of approximately VDD on the transformer outputs. In other words, the use of complimentary transistors for switches as shown in FIG. 5 may allow for larger signal swings by an amount, VDD, before clipping of the output signal may typically occur. A similar type of signal enhancement of VDD may be achieved for operation in band 2 or high band, when using the complimentary set of transistors 518, 520 (e.g., as compared to using two transistors of a same type, as shown in FIG. 4). In an example embodiment, an AC-coupling capacitor (not shown) may be used at (or coupled to) one or both of the outputs to eliminate or at least decrease DC bias at VDD.

Figure 6:
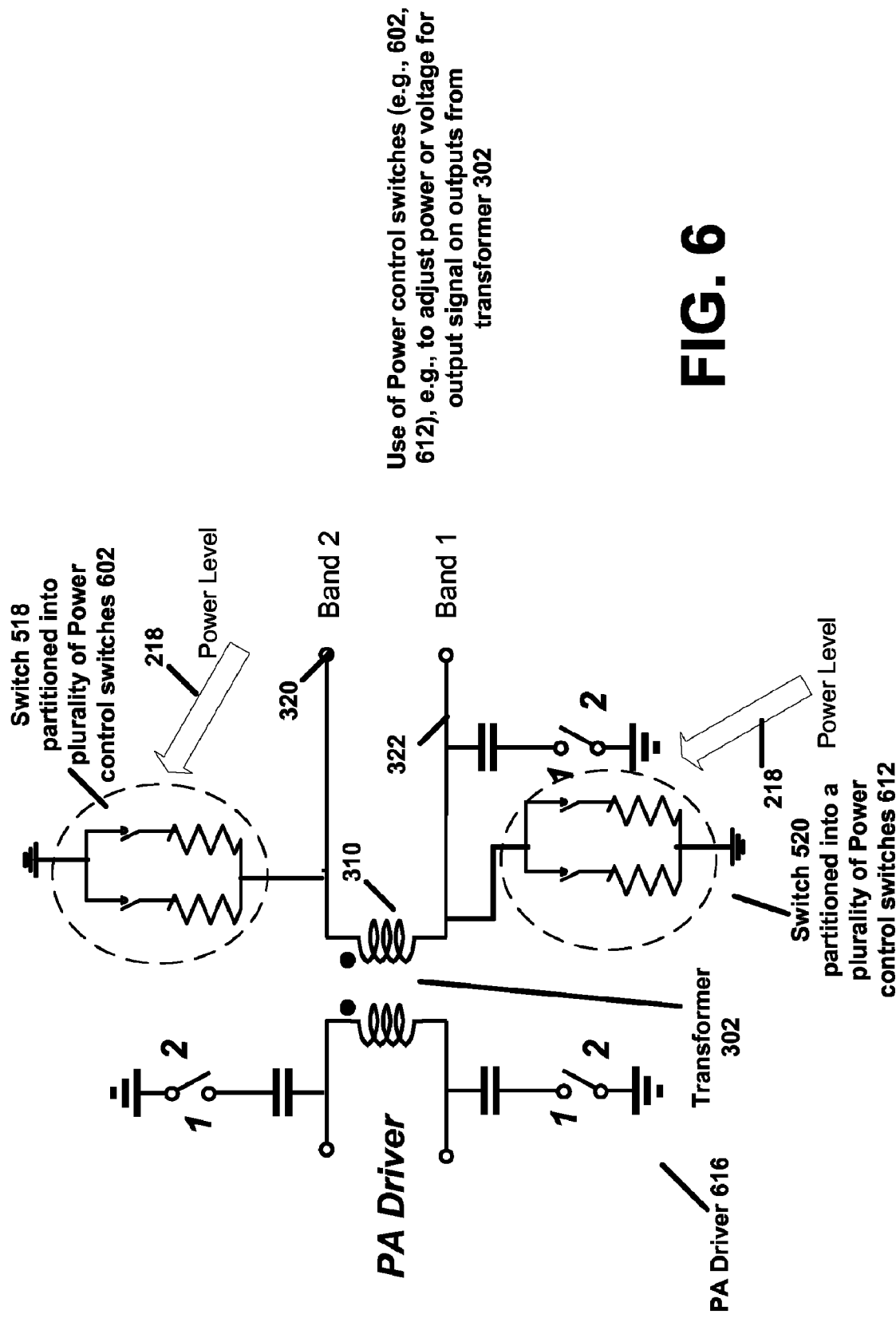
FIG. 6 is a diagram illustrating a multi-band PA driver according to yet another example embodiment where power control may be applied to the outputs.

FIG. 6 is a diagram illustrating a multi-band PA driver 616 according to yet another example embodiment where power control may be applied to the outputs. According to an example embodiment, each of switches 518 and 520 may be partitioned or divided into a plurality of switches or transistors to provide power control by opening or closing one or more of the switches. These transistors or switches may be referred to as power control switches. For example, switch 518 may be partitioned into a plurality of switches 602, while switch 520 may be partitioned into a plurality of switches 612. Switches 602 and/or 612 may be used to adjust or control the output power. Each switch or transistor 602, 612, may inherently include some resistance, and this resistance is shown in FIG. 6 as s resistor coupled to each power control switch. Although, when implemented as transistors, a separate resistor may not be included, for example.

In an example embodiment, the power control switches 602 and/or 612 may be used to selectively vary the power (or voltage) of a signal output onto transformer outputs 320 and/or 322. The power or voltage of signals on outputs 320 and 322 may be varied, for example, based on a received power control signal via line 218. The power control signal 218 may include one or more digital signals that may control each of the switches of power control switches 602 and/or 612 to control the power of signals on outputs 320 and 322.

Referring to FIG. 6, in an example embodiment, if all of the power control switches 602 and 612 are open, the voltage (or power) across the secondary winding 310 (FIG. 3) may be divided approximately equal across outputs 320 and 322. In one embodiment, switches 602 and 612 may be considered power control switches. In another illustrative embodiment, if all the power control switches (e.g., 612) coupled to output 322, for example, are on, then output 322 may be substantially pulled to ground, and substantially all of the voltage across the secondary winding 310 of transformer 302 may then typically be provided or output to output 320. In this example, the power control switches (602) may be left open (or turned off). In this manner, by opening all (or substantially all) power control switches coupled to a selected output (e.g., output 320) and closing all (or substantially all) power control switches (turning on all power control transistors) coupled to an unselected output (e.g., output 322), substantially all of the voltage or power received across the secondary winding 310 may be transferred or output onto the selected output of the transformer 302.

The power or voltage applied to the selected output (e.g., output 322) may thereafter be decreased by opening one or more switches coupled to the unselected output, which may increase the voltage on the unselected output, thereby decreasing the voltage on the selected output. This is because the voltage (or power) output from secondary winding 310 may be divided or allocated across the two outputs 320, 322, and opening a switch coupled to the unselected output may increase the voltage to the unselected output, thereby decreasing the voltage or power to the selected output. Similarly, voltage or power to the selected output (e.g., output 322) may be further decreased by closing one or more power control switches coupled to the selected output. Closing switches coupled to the selected output may decrease the power or voltage on the selected output, according to an example embodiment. Opposite operations may be performed in order to increase power to a selected output, e.g., power or voltage applied to a selected output may be increased by opening one or more power control switches coupled to a selected output and/or by closing one or more power control switches coupled to an unselected output.

Figure 7:
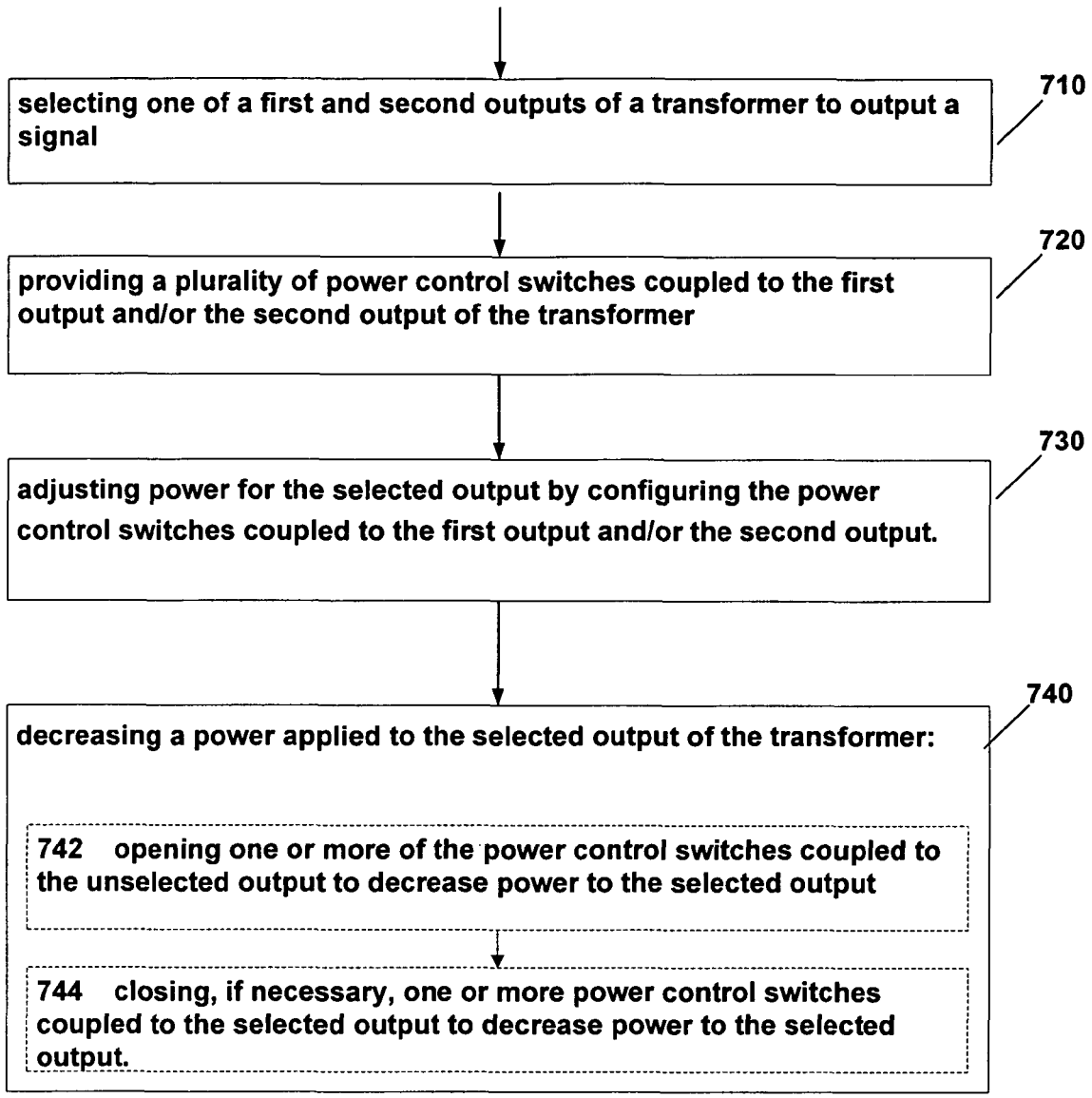
FIG. 7 is a flow chart illustrating operation of power control being performed for a transformer according to an example embodiment.

FIG. 7 is a flow chart illustrating operation of power control being performed for a transformer according to an example embodiment. At 710, one of a first and second outputs of a transformer may be selected to output a signal. For example, output 322 of transformer 302 may be selected to output a signal associated with band 1, e.g., to drive PA 228. This selection may be based upon the band or frequency in which the multi-band transmitter 200 is operating, e.g., operating in band 1 or low band.

At 720, a plurality of power control switches may be coupled, e.g., in parallel, to the first output and/or second output. For example, power control switches 602 may be coupled to output 320, while power control switches 612 may be coupled to output 322. Power control switches may be provided as NMOS or PMOS transistors, for example.

At 730, power for the selected output may be adjusted by configuring the power control switches coupled to the first output and/or the second output. For example, one or more switches of power control switches 602 and/or of power control switches 612 may be configured (e.g., opened or closed) to adjust power or voltage applied to the selected output.

At 740, power applied to the selected output may be decreased by opening one or more of the power control switches coupled to the unselected output (742), and then closing, if necessary, one or more power control switches coupled to the selected output (744).

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. An apparatus comprising:
 a multi-band transformer configured to receive input signals from a plurality of frequency bands, the transformer including one or more inputs and at least a first output and a second output;
 one or more switches coupled to the outputs of the transformer and configured to selectively output a received input signal onto the first output and/or the second output of the transformer;
 a first power amplifier having an input coupled to the first output of the transformer, the first power amplifier configured to receive and amplify, when present, a signal associated with a first frequency band of the plurality of frequency bands; and
 a second power amplifier having an input coupled to the second output of the transformer, the second power amplifier configured to receive and amplify, when present, a signal associated with a second frequency band of the plurality of frequency bands.

2. The apparatus of claim 1 wherein the one or more switches comprises:
 one or more switches coupled to the transformer and configured to control a received input signal associated with the first frequency band to be output onto the first output of the transformer, and to control a received input signal associated with the second frequency band to be output onto the second output of the transformer.

3. The apparatus of claim 1 wherein the one or more switches comprises:
 a first switch coupled to the first output of the transformer and configured to selectively couple the first output to a first voltage to output a received signal associated with the second frequency band onto the second output of the transformer; and
 a second switch coupled to the second output of the transformer and configured to selectively couple the second output to a second voltage to output a received signal associated with the first frequency band onto the first output of the transformer.

4. The apparatus of claim 3 wherein the first and second switches comprise a pair of complimentary transistors.

5. The apparatus of claim 4 wherein the pair of complimentary transistors comprise a PMOS transistor coupled to a positive voltage and an NMOS transistor coupled to ground.

6. The apparatus of claim 1 wherein the one or more inputs of the transformer comprise first and second differential inputs, and wherein the first and second outputs of the transformer comprise a first single-ended output and a second single-ended output.

7. The apparatus of claim 6 wherein the one or more switches comprises:
 a plurality of power control switches coupled to one of the single-ended outputs of the transformer to selectively vary, based on a received power control signal, the power of a signal output onto the first or second single-ended outputs of the transformer.

8. The apparatus of claim 1 and further comprising one or more switchable capacitors coupled to the transformer to selectively tune an operation of the transformer to either the first frequency band or the second frequency band.

9. An apparatus comprising:
a multi-band transformer configured to receive as an input a signal associated with a first frequency band or a signal associated with a second frequency band, the multi-band transformer including:
    a first transformer winding coupled to first and second differential inputs; and
    a second transformer winding coupled to a first single-ended output and a second single-ended output, the first single-ended output configured to output a signal associated with a first frequency band and the second single-ended output configured to output a signal associated with a second frequency band;
one or more switches coupled to the transformer and configured to selectively output a received input signal onto the first single-ended output and/or the second single-ended output, the one or more switches including:
    a first switch coupled to the first single-ended output of the transformer and configured to selectively couple the first single-ended output to a first voltage to substantially allow a signal associated with the second frequency band to be output onto the second single-ended output of the transformer; and
    a second switch coupled to the second single-ended output of the transformer and configured to selectively couple the second single-ended output to a second voltage to substantially allow a signal associated with the first frequency band to be output onto the first single-ended output of the transformer;
a first power amplifier having an input coupled to the first single-ended output, the first power amplifier configured to receive and amplify the signal associated with the first frequency band when present; and
a second power amplifier having an input coupled to the second single-ended output, the second power amplifier configured to receive and amplify the signal associated with the second frequency band when present.

10. The apparatus of claim 9 wherein the first and second switches comprise a pair of complimentary transistors.

11. The apparatus of claim 9 wherein the pair of complimentary transistors comprise a PMOS transistor coupled to a positive voltage and an NMOS transistor coupled to ground.

12. The apparatus of claim 9 and further comprising a capacitor and a switch coupled in series between the transformer and ground to selectively tune an operation of the transformer to either the first frequency band or the second frequency band based on a state of the switch.

13. The apparatus of claim 9 and further comprising:
a first capacitor and a third switch coupled in series to an input of the transformer; and
a second capacitor and a fourth switch coupled in series to an output of the transformer, the first and second capacitors configured to selectively tune an operation of the transformer to either the first frequency band or the second frequency band based on a state of the third and fourth switches.

14. The apparatus of claim 9 wherein the first and second switches comprise one or more power control switches to selectively vary, based on a received power control signal, the power of a signal output onto the first or second single-ended outputs of the transformer.

15. The apparatus of claim 14 wherein the one or more power control switches comprises:
one or more power control transistors coupled to the first single-ended output of the transformer; and
one or more power control transistors coupled to the second single-ended output of the transformer.

16. An apparatus comprising:
a transformer including:
    a first transformer winding coupled to first and second differential inputs; and
    a second transformer winding coupled to a first single-ended output and a second single-ended output, the first single-ended output configured to output a signal associated with a first frequency band and the second single-ended output configured to output a signal associated with a second frequency band;
a first switch coupled to the first single-ended output of the transformer and configured to selectively couple the first single-ended output to a first voltage to substantially allow a signal associated with the second frequency band to be output onto the second single-ended output of the transformer;
a second switch coupled to the second single-ended output of the transformer and configured to selectively couple the second single-ended output to a second voltage to substantially allow a signal associated with the first frequency band to be output onto the first single-ended output of the transformer;
a voltage controlled oscillator (VCO) configured to output a modulated signal associated with the first frequency band;
a frequency divider coupled to an output of the VCO and to output a phase modulated signal associated with the second frequency band; and
a multiplexer having a first input coupled to an output of the VCO and a second input coupled to an output of the frequency divider and one or more outputs coupled to the inputs of the transformer, the multiplexer configured to selectively output either the modulated signal associated with either the first frequency band or the second frequency band.

17. A method comprising:
selecting one of a first and second outputs of a multi-band transformer to output a signal received at an input of the multi-band transformer;
providing a plurality of power control switches coupled in parallel to the first output and/or the second output of the transformer;
adjusting power for the selected output by configuring the power control switches coupled to the first output and/or the second output;
decreasing a power applied to the selected output of the transformer, by:
    opening one or more of the power control switches coupled to the unselected output to decrease power to the selected output; and
    closing, if necessary, one or more power control switches coupled to the selected output to decrease power to the selected output.

* * * * *